US012369047B2

(12) United States Patent
Alizadeh et al.

(10) Patent No.: US 12,369,047 B2
(45) Date of Patent: Jul. 22, 2025

(54) NETWORK USER ASSOCIATION

(71) Applicant: Trustees of Tufts College, Medford, MA (US)

(72) Inventors: Alireza Alizadeh, Arlington, MA (US); Mai Vu, Belmont, MA (US)

(73) Assignee: Trustees of Tufts College, Medford, MA (US)

(*) Notice: Subject to any disclaimer, the term of this patent is extended or adjusted under 35 U.S.C. 154(b) by 112 days.

(21) Appl. No.: 17/612,773

(22) PCT Filed: May 21, 2020

(86) PCT No.: PCT/US2020/033962
§ 371 (c)(1),
(2) Date: Nov. 19, 2021

(87) PCT Pub. No.: WO2020/237030
PCT Pub. Date: Nov. 26, 2020

(65) Prior Publication Data
US 2022/0248239 A1 Aug. 4, 2022

Related U.S. Application Data

(60) Provisional application No. 62/851,034, filed on May 21, 2019.

(51) Int. Cl.
*H04W 24/02* (2009.01)
*H04B 7/024* (2017.01)
(Continued)

(52) U.S. Cl.
CPC ........... *H04W 24/02* (2013.01); *H04W 28/16* (2013.01); *H04W 48/20* (2013.01); *H04W 76/20* (2018.02); *H04B 7/024* (2013.01)

(58) Field of Classification Search
CPC ..... H04W 24/02; H04W 76/20; H04W 28/16; H04W 48/20; H04B 7/024
See application file for complete search history.

(56) References Cited

U.S. PATENT DOCUMENTS 10,050,844 B2 * 8/2018 Flanagan ............... H04W 16/18
11,166,171 B2 * 11/2021 Tilli ....................... H04W 16/22
(Continued)

FOREIGN PATENT DOCUMENTS

CN 108055670 A 5/2018
CN 109451571 A * 3/2019 ............ H04W 52/34
(Continued)

OTHER PUBLICATIONS

Translation of CN-109451571-A (Year: 2019).*
International Search Report and Written Opinion, PCT Application No. PCT/US2020/033962, mailed Sep. 14, 2020 (12 pages).

*Primary Examiner* — Matthew C Sams
(74) *Attorney, Agent, or Firm* — Occhiuti & Rohlicek LLP

(57) ABSTRACT

A method for user association, i.e., user equipment-base station, UE-BS, association, in a cellular network is specifically designed for user association, for instance in 5G mmWave cellular networks. The method is based on the rational that network throughput may be low because of the weakest UE suffering from a weak direct link or high interference from other BSs in the network. Thus, swapping the worst UE-BS connection is likely to provide the UE a stronger link, i.e. a better connection to another BS, and/or reduce the interference, which consequently improves the throughput. An optional approach is based on matching theory, which uses preference lists maintained at the BSs and UEs.

19 Claims, 6 Drawing Sheets

(51) Int. Cl.
*H04W 28/16* (2009.01)
*H04W 48/20* (2009.01)
*H04W 76/20* (2018.01)

(56) References Cited

U.S. PATENT DOCUMENTS

2011/0064035 A1    3/2011  Guerreiro et al.
2013/0201937 A1    8/2013  Sun et al.
2015/0282070 A1*  10/2015  Salem ............... H04W 52/0206
                                              370/311
2017/0070396 A1*   3/2017  Flanagan ............ H04L 41/0823
2020/0288327 A1*   9/2020  Tilli ..................... H04W 28/06

FOREIGN PATENT DOCUMENTS

EP              2728926 A1 *  5/2014  ............ H04W 28/08
WO           2017209578 A1   12/2017
WO        WO-2019052658 A1 *  3/2019  ............ H04W 16/22
WO        WO-2023204744 A1 * 10/2023

\* cited by examiner

NETWORK USER ASSOCIATION

CROSS-REFERENCE TO RELATED APPLICATIONS

This application is a 371 Application of International Application No. PCT/US2020/033962, filed May 21, 2020, which claims the benefit of U.S. Provisional Application No. 62/851,034, filed May 21, 2019, which is incorporated herein by reference.

BACKGROUND

This invention relates to network user association, for example for millimeter wave MIMO networks, and in particular to determining user association to maximize network utility (e.g., overall capacity or throughput).

User association is an important problem in a variety of wireless networks in which a user may be able to connect to any of one or more base stations surrounding the user, for instance in 5G millimeter wave (mmWave) networks and beyond, which use a concept called "network densification," to determine which base station (BS) a user equipment (UE) connects to in order to balance base station loads and maximize network utility, such as throughput. Given that the connections may be highly directional and vulnerable to small channel variations, and that network deployment is expected to be dense where each UE can be surrounded by several BSs, user association may be optimized and updated frequently at the frame time scale or at a chosen regular interval to maintain network performance.

SUMMARY

In one aspect, in general, a method for UE-BS association in a cellular network is specifically designed for user association in 5G mmWave cellular networks. The method is based on the rational that network utility (e.g., throughput) may be low because of the weakest UE suffering from a weak direct link or high interference from other BSs in the network. Thus, swapping the worst UE-BS connection is likely to provide the UE a stronger link (better connection to another BS) and/or reduce the interference, which consequently improves the throughput. This reasoning leads to approach to swap the BS in the worst UE-BS connection with all other BSs and then take the best configuration which results in the highest network throughput. The method has fast convergence with the number of iterations growing linearly with the number of UEs, and the runtime growing quadratically, which is several orders of magnitude faster than the popular genetic algorithm and exhaustive search. The implementation of this algorithm in a cellular system is straightforward and efficient using the new cloud radio access network (C-RAN) architecture.

In another aspect, in general, a method is used to maximizing a measure of total capacity of a network. The network includes a plurality of base stations ("BS"), a plurality of user devices (also referred to as user equipment, "UE"), and a plurality of associations, each of which has a corresponding user device of the plurality of user devices and a corresponding a base station of the plurality of base stations (i.e., each association links one user device and one base station). The method includes performing an iteration, where each iteration includes the following steps. A current total capacity (or other utility) of a plurality of current associations is evaluated based on a measure of capacity for each association in a plurality of current associations. A swapping association is selected from the plurality of current associations. For instance, the association with the lowest capacity of the current associations is selected as the swapping association. This swapping association links a corresponding swapping base station in the plurality of base stations and a corresponding swapping user device in the plurality of user devices. A total capacity of the network is evaluated resulting from each of a number of possible swapping of the swapping association with other associations of the swapping user device and other base stations (i.e., other than the swapping base station) of the plurality of base stations. A swapping of two associations corresponds with exchanging the base stations, or equivalently exchanging the user equipment, of the two associations to yield two modified associations. A best total capacity resulting from the possible swapping is determined. A determination is made as to whether this best total capacity exceeds the current total capacity. The plurality of current associations is then modified based on the determination of whether the best total capacity exceeds the current total capacity. This modification includes modifying an association corresponding to the swapping user device.

Aspects can include one or more of the following.

In at least some iteration, determining whether the best total utility exceeds the current total utility includes determining that the best total utility exceeds the current total utility. Modifying the plurality of current associations include swapping the swapping association and an association among the other associations. That association yields the best total utility. The swapping has the effect of removing the swapping association and the association of the other associations and adding an association of the swapping user device and the base station of the other association and adding an association of the user device of the other association and the swapping base station.

In at least some iteration, determining whether the best total utility exceeds the current total utility includes determining that the best total utility does not exceed the current total utility. Modifying the plurality of current associations the plurality of current associations include switching the swapping association and an other association of the plurality of current associations.

The other association of the plurality of current associations is selected by selecting a user device other than the swapping user device such that different user devices are selected in different iterations.

The measure of capacity an association in a plurality of associations depends on channel characteristics between the corresponding user device and corresponding base station, as well as the channel between all user devices and all base stations including the ones not associated with the user device or the base station in question.

The channel characteristics between the corresponding user device and corresponding base station have multiple-input multiple-output (MIMO) channel characteristics. This has the advantage beamforming characteristics that are used by multiple antenna base stations are taken into account when determining channel characteristics.

The measure of capacity of an association depends on channel characteristics between user devices and base stations corresponding to other associations of the plurality of associations. This has the advantage that the channel capacity between a particular user device and its associated base station takes into account interference (or potential interference) resulting from other associations of base stations and user devices.

In another aspect, in general, an approach to distributed user association is based on matching theory. A distributed matching game allows users to apply for association with their ranked-preference base station in a distributed fashion. In some examples, an early acceptance is provided to users as soon as they are in the base station's preference list with available quota.

In another aspect, in general, a method associates a plurality of user devices with a plurality of base stations in a communication network. The method comprises a distributed process performed at the user devices and the base stations. the distributed process comprises: at each user device (UE k), maintaining a preference list ($P_k^{UE}$) representing an ordered subset of the base stations; at each base station (BS j), maintaining a preference list ($P_j^{BS}$) representing an ordered subset of the user devices; and at a first iteration of a plurality of interative steps of the distributed process, for each user device of at least some of the user devices, sending a respective first application message from said user device to a respective first base station selected from the preference list of said user device, and at a first base station of the plurality of base stations, receiving application messages sent from multiple of the user devices, selecting one or more of the user devices based at least in part on the received application messages, rejecting one or more of the user devices not selected by said base station, and sending rejection messages to the rejected one or more of the user devices.

Aspects may include one or more of the following.

At each iteration of the plurality of iterative steps, the first base station selects user devices from a set of user devices comprising user devices from which application messages were received.

The set of user devices from which said base station selects further comprises a waiting list of base stations maintained by said base station, and the first base station updates the waiting list based on the selected base stations.

The waiting list maintained by the first base station includes a number of user devices less than or equal to a first quota of user devices associated with the first base station.

Selecting the one or more of the user devices comprises selecting a number of user devices less than or equal to the first quota of user devices.

The rejected one or more user devices comprise user devices from which application messages were received and user devices in the waiting list for the base station, and that were not selected by the base station.

At a second iteration of the plurality of iterative steps of the distributed process, a rejection message is received at a first user device, and the first user device sends a second application message to a second base station selected from the preference list of said user device, where that second base station has a lower preference than the first base station selected by the first user device in the first iteration.

At a last iteration of the plurality of iterative steps of the distributed process, each base station forms an association with user devices according to the waiting list at said base station.

Maintaining the preference lists comprises maintaining said lists according to at least one of highest instantaneous communication rates between user devices and base stations, channel norms of channels between the user devices and the base stations, and channel quality indicators of channels between the user devices and the base stations.

At the first iteration at the first base station, an application message is received from a first user device that is in a top part of the first base station's preference list, and an acceptance message is send from the first base station to said first user device forming an association between the first bases station and the first user device.

The plurality of iterative steps of the iterative procedure are repeated to form successive associations of the user devices and the base stations.

The base stations data provide representing associations between user devices and base stations determined using the interative steps of the distributed process to a central controller, and receive from the controller updated associations between the user devices and the base stations.

The information representing the associations comprises data characterizing channels corresponding to the associations.

Other features and advantages of the invention are apparent from the following description, and from the claims.

DETAILED DESCRIPTION

1 Centralized Matching Embodiment

Figure 1:
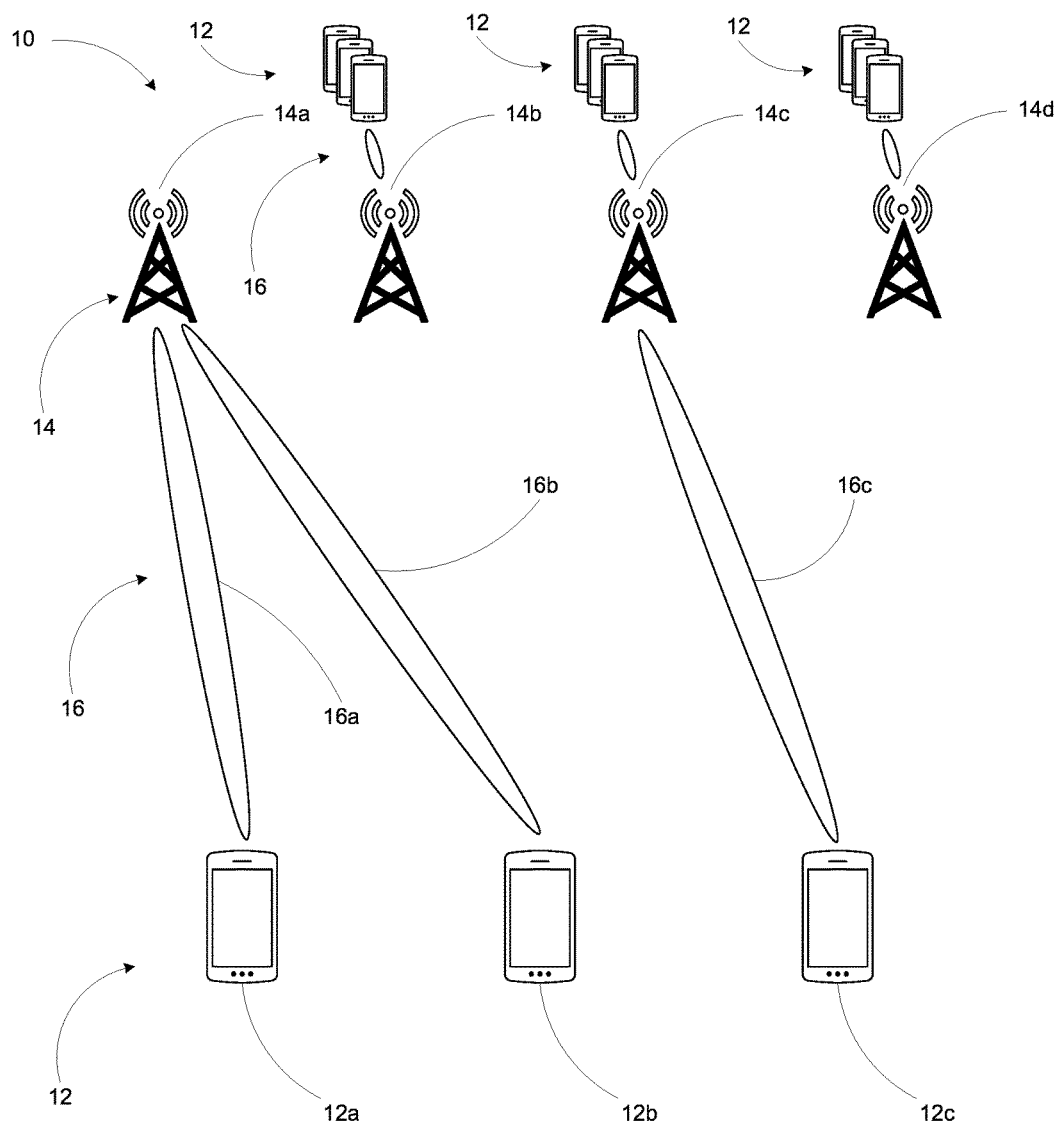
FIG. 1 is an exemplary wireless network with user devices connected to base stations via respective wireless associations.

Referring to FIG. 1, a first embodiment, which makes use of a centralized approach to matching, is described below with reference an exemplary network 10. The network 10 consists of a plurality of user devices 12 communicating with base stations in a plurality of base stations 14 via a set of wireless associations 16. Each user device in the plurality of user devices 12 is shown to have exactly one base station in the plurality of base stations 14 with which it is communicating, and this communication is represented by exactly one wireless association of the plurality of wireless associations 16 between a user device and base station communicating with one another. For example, a first user device 12a is shown to be communicating with a first base station 14a via a first wireless association 16a. (Note that reference to communication via an association refers to communication on a radio channel between the stations that are associated, and in general, the radio channel is directional by virtue of use of multiple antennas at the base station and/or the user device.) The first wireless association 16a is shown to be the only association being maintained by the first user device 12a—as such, it is the only wireless association in the set of wireless associations 16 shown to be associated with the first user device 12a. Conversely, each base station in the plurality of base stations 14 can receive multiple wireless associations. This is illustrated by the fact that a second wireless association 16b, though being the only wireless association in the plurality of wireless associations 16 associated with a second user device 12b, is associated with the first base station 14a of the plurality of base stations, thereby sharing a base station with the first user device 12a and its associated wireless signal 16a. A third user device 12c in the plurality of user devices 12 is shown to be communicating with a third base station 14c in the plurality of base stations 14 via a third wireless association 16c in the plurality of wireless associations 16. A second base station 14b and a fourth base station 14d, both part of the plurality of base stations 14, are shown to have no wireless associations associated with them.

Very generally, the approach described below attempts to select the associations 16 between the user devices 12 and the base stations 14 such that a total utility is maximized, and in particular a total communication capacity measured as the sum of the capacity on each association is maximized. The approach is iterative, such that at each iteration one association changes such that over time, the overall utility is increase and ideally maximized. Note that as user devices move and channel conditions change, the approach tracks these changes to maintain a good association that adapts to the changes.

At the start of the iteration, the total current capacity is evaluated as the sum of the capacities of the associations in the current set of associations. In FIG. 1, this corresponds to the sum of the capacities of associations 16a-c. Note that this evaluation takes into account a best selection of MIMO based beamforming configurations for each of the associations, and the resulting interference between communication on different of the associations. In at least some examples, the evaluation of total capacity is made for downstream channels only from the base stations to the user devices.

One of the associations is selected for swapping. In some implementations, this association is selected as having the lowest capacity. In this illustrative example, we assume that association 16b linking user device 12b and base station 14a has the lowest capacity.

Figure 2:
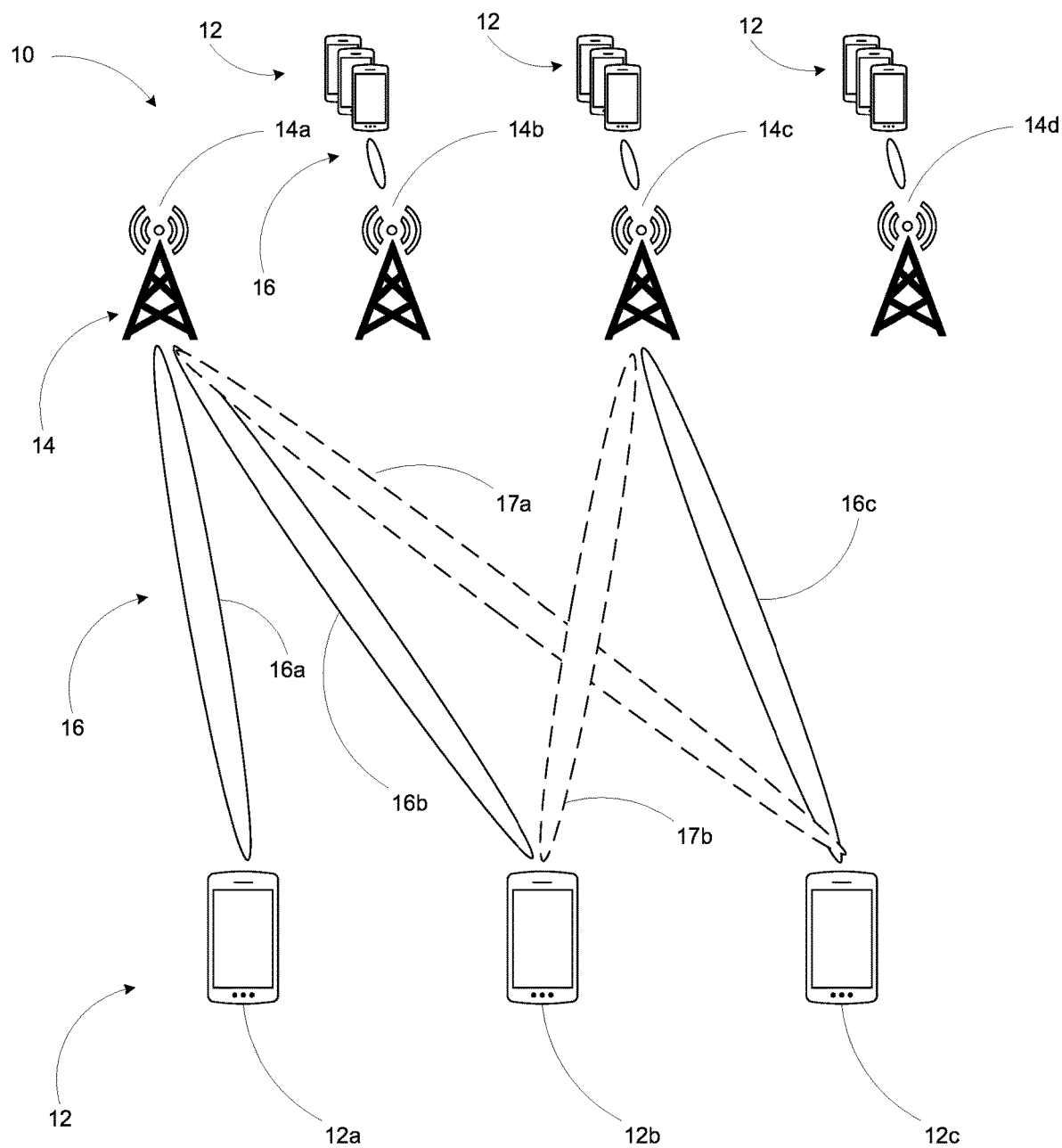
FIG. 2 is the network of FIG. 1, further illustrating one of the user devices with a potential alternative wireless association that is different from the wireless association it is currently using.

Referring now to FIG. 2, the network 10 seen in FIG. 1 is shown illustrating an evaluation of the result of swapping association 16b (for the sake of clarity referred to as the "swapping association") with other possible associations of the user device 12b (referred to as the "swapping user device") and base stations other than base station 14a (referred to as the "swapping base station"). Here, the system evaluates the total capacity resulting from the second user device 12b having a potential (i.e., proposed) association 17 with base station 14b rather than its current association with base station 14a. The system evaluates the result of the swapping of association 16b with 17. That is, the system evaluates the total capacity with associations 16a, 17a, 17b, and 16c. The potential wireless associations 17a and 17b are representative of a pair of potential wireless associations (i.e., resulting in swapping associations 16b and 16c) between the second user device 12b and third base station 14c, as well as a potential wireless connection between the third user device 12c and the first base station 14a. The total capacities resulting from each of the swappings are compared, and one of these potential swaps is determined to have the best total capacity after the swap.

At this point in the iteration, a determination is made as to whether the best total capacity after the swap is better than the current total capacity, and a modification of the associations is made according to this determination. There are two possible results of the determination: either the swap improves the total capacity, or it does not.

Figure 3:
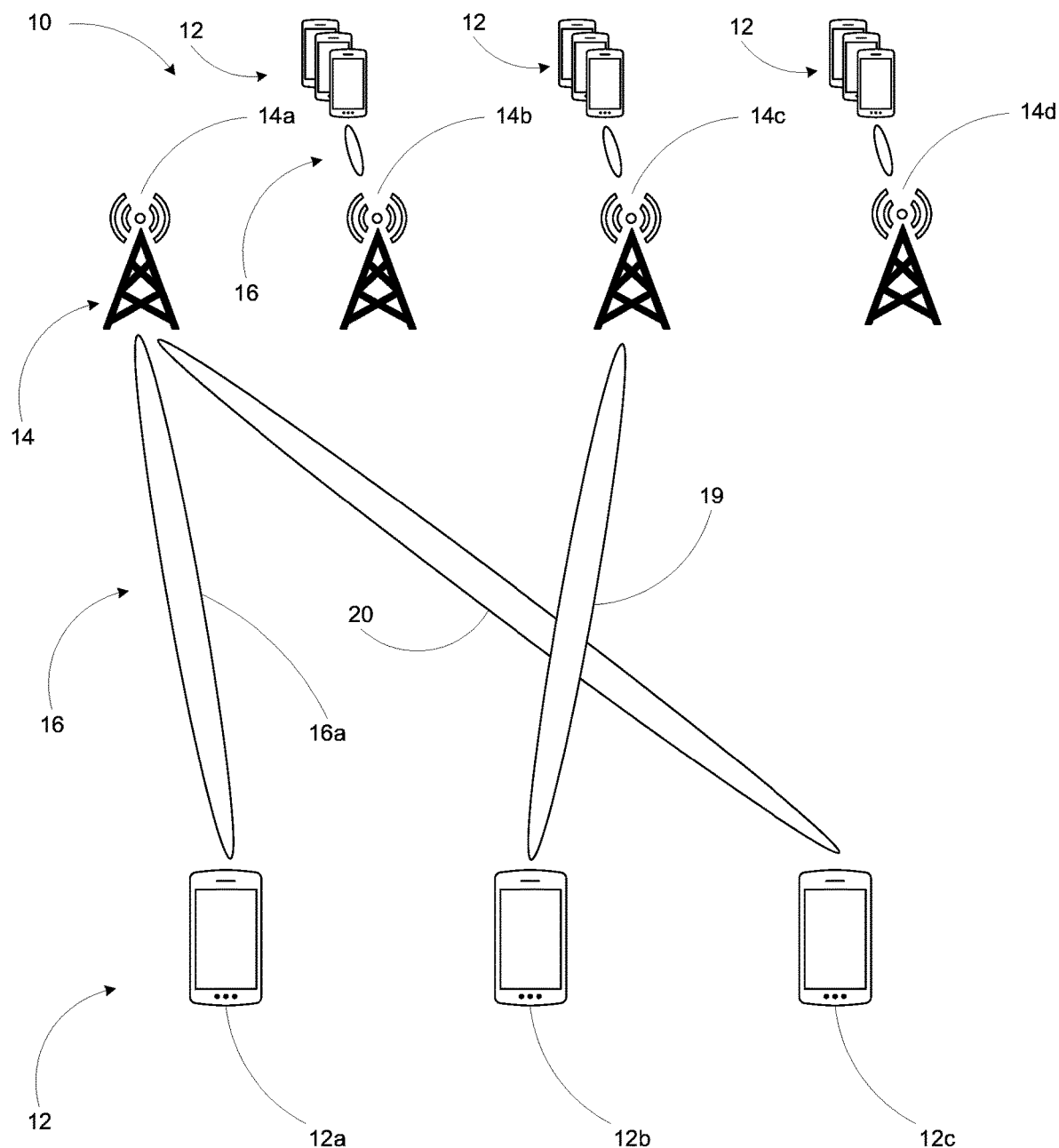
FIG. 3 is the network of FIG. 1 after switching base stations of two respective user devices.

Referring to FIG. 3, the result is shown in the event that the total capacity is would be improved by the swapping assessed in FIG. 2. In this example, the association 16c shown in FIG. 1 is selected as that other association. Having selected that other association, the base stations associated with those respective wireless associations (16b and 16c) are exchanged resulting in removal of those association, and insertion of new associations 19 and 20, linking user device 12b and base station 14c and user device 12c and base station 14a, respectively.

In at least some iterations, a determination is made that the best swap will not improve the total capacity. When such a determination is made, another association is selected for swapping (e.g., as a pseudo random selection, a selection according to the iteration index, etc.) and the swap is made in the manner illustrated above, without improving overall utility.

After performing a modification of the associations, either of the type shown in FIG. 3, the iteration repeats until all potential switching associations have been exhausted.

2 System and User Association Models

A number of further embodiments are described below in the context of the following system and user association model. In particular, at least some of the embodiments address user association in the downlink of a two-tier heterogeneous network (HetNet) with one macro cell BS (MCBS) operating at microwave band, J−1 small cell BSs (SCBSs) working at millimeter wave (mmWave) band, and K UEs. Let $\mathcal{J}=\{1, \ldots, J\}$ denotes the set of all BSs, and $\mathcal{K}=\{1, \ldots, K\}$ represents the set of UEs. Each BS j has $M_j$ antennas, and each UE k is equipped with two antenna modules: 1) a single-antenna module for LTE/4G connections at microwave band, and 2) a UPA antenna with $N_k$ element for 5G connections at mmWave band. Each UE k aims to receive $n_k$ data streams from its serving BS such that $1 \leq n_k \leq N_k$, where the upper inequality comes from the fact that the number of independent data streams for each UE cannot exceed the number of its antennas. We assume that each UE is equipped with a multi-mode modem that can support both sub-6 GHz and mmWave bands so that association to either MCBS or SCBS is possible.

2.1 Microwave and mmWave Channel Models

In this subsection, we introduce the microwave and mmWave channel models. In the microwave band the transmissions are omnidirectional and we use a Gaussian channel model. We denote $h_{\mu W}$ as the channel vector between a MCBS and a UE where its entries are i.i.d. complex Gaussian random variables with zero-mean and unit variance, i.e., $h_{\mu W} \sim \mathcal{CN}(0, 1)$. In the mmWave band, the transmissions are highly directional and the Gaussian MIMO channel model no longer applies. We employ the specific clustered mmWave channel model which includes C clusters with L rays per cluster defined as $$H_{mmW} = \frac{1}{\sqrt{CL}} \sum_{c=1}^{C} \sum_{l=1}^{L} \sqrt{\gamma_c}\, a(\phi_{c,l}^{UE}, \theta_{c,l}^{UE}) a^*(\phi_{c,l}^{BS}, \theta_{c,l}^{BS}) \qquad (1)$$

where $\gamma_c$ is the power gain of the cth cluster. The parameters $\phi^{UE}$, $\theta^{UE}$, $\phi^{BS}$, $\theta^{BS}$ represent azimuth angle of arrival (AoA), elevation angle of arrival (EoA), azimuth angle of departure (AoD), and elevation angle of departure (EoD), respectively. The vector $a(\phi, \theta)$ is the response vector of a uniform planar array (UPA) which allows 3D beamforming in both the azimuth and elevation directions. We consider the probability of LoS and NLoS, and utilize the path loss model for LoS and NLoS links.

2.2 Signal Model

In a HetNet composed of different types of BSs, each BS can have a different quota of the number of UEs it can serve simultaneously. We assume each BS's quota is determined based on its available resources (data streams). Thus, we can define the total number of downlink data streams sent by BS j as $$D_j = \sum_{k \in S_j} n_k \quad (2)$$

where $S_j$ is called the Activation Set of BS j which represents the set of active UEs in BS j, such that $S_j \subseteq \mathcal{K}$, $|S_j|=q_j \leq K$, and $q_j$ is the quota of BS j. The total number of downlink data streams sent by each BS should be less than or equal to its number of antennas, i.e., $D_j \leq M_j$. All analysis and results in this paper are per association block, and thus we do not consider a time index in our formulations.

The $M_j \times 1$ transmitted signal from the BS can be defined as $$x_j = F_j d_j = \sum_{k \in S_j} F_k s_{k,j} \quad (3)$$

where $s_{k,j} \in \mathbb{C}^{n_k}$ is the intended data stream vector for UE k sent from BS j which consists of mutually uncorrelated zero-mean symbols, with average power $\mathbb{E}[s^*_{k,j} s_{k,j}] = P_{k,j}$. The column vector $d_j \in \mathbb{C}^{D_j}$ represents the vector of data symbols of BS j, which is the vertical concatenation of the data stream vectors $s_{k,j}$, $k \in S_j$. Matrix $F_{k,j} \in \mathbb{C}^{M_j \times n_k}$ is the unitary linear precoder (transmit beamforming matrix) for each UE k associated with BS j with $\text{Tr}(F_{k,j} F^*_{k,j})=1$. Matrix $F_j \in \mathbb{C}^{M_j \times D_j}$ the linear precoder of BS j which is the horizontal concatenation of users' linear precoders. The power constraint at BS j is given by $\mathbb{E}[x^*_j x_j] = \sum_{k \in S_j} P_{k,j} \leq P_j$, where $P_{k,j}$ represents the transmit power from BS j to UE k, and $P_j$ is the total transmit power of BS j.

The post-processed signal of UE k after receive beamforming is given by $$\hat{y}_k = \sum_{j \in \mathcal{J}} W^*_k H_{k,j} x_j + W^*_k z_k \quad (4)$$

where $H_{k,j} \in \mathbb{C}^{N_k \times M_j}$ represents the channel matrix between BS j and UE k, and $W_k \in \mathbb{C}^{N_k \times n_k}$ is the unitary linear combiner (receive beamforming) matrix of UE k. $z_k \in \mathbb{C}^{N_k}$ is the white Gaussian noise vector at UE k, with $z_k \sim \mathcal{CN}(0, N_0 I_{N_k})$ and $N_0$ is the noise power spectral density.

The presented signal model is applicable to a wide range of types of transmit beamforming and receive combining. In a number of embodiments, we assume channel matrices between each pair of UE-BS are available through CSI estimation techniques. Then, singular value decomposition (SVD) technique may be used to obtain precoding and combiner matrices at BSs and UEs, respectively. Variants of the approaches described below can be applied to other types of beamforming including hybrid (analog and digital) beamforming which can be implemented in mmWave systems to reduce cost and power consumption of large antenna arrays.

2.3 User Association Model

Because of directional beamforming in mmWave systems, the interference structure depends on the user association. Taking into account the interference structure is important for mmWave systems where the channels are probabilistic and fast time-varying, and the interference depends on the highly directional connections between BSs and UEs. In a number of embodiments described below user association is performed during a time duration which we call an association block, which can span a single or multiple transmission time slots depending on the availability of CSI and is a design choice.

In particular, in each association block, the user association process happens in the header sub-block which establishes the UE-BS connection for the rest of the association block. The header sub-block is further divided into sub-slots during each of which UEs can apply to a BS for association. In a fully distributed algorithm, UE-BS associations can be determined at the end of each sub-slot in the header sub-block. In centralized or semi-distributed algorithms, however, final user association is determined at the end of the header sub-block. The length of the association header sub-block therefore can vary for each UE's association block depending on the delay in the association process for that UE. In the next association block, the user association process needs to be performed again to update associations according to users' mobility and channel variations. Specifically, an association block can represent a single time slot, when both instantaneous (small-scale) and large-scale CSI are available, or it can be composed of several consecutive time slots when only large-scale CSI is available. Such a choice will lead to a trade-off between user association overhead and resulting network performance.

We use the microwave and mmWave channel models presented above in Sec. 2.1 to generate CSI for each association block. Alternatively a simple mmWave channel model based on large-scale fading components and antenna gains. In that case, the present user association scheme is still applicable as the large-scale parameters remain constant for a longer period of time.

In unique user association each UE can be served by only one BS in each association block. That is, UE-BS associations can be completely determined by an association vector $\beta$ defined as follows $$\beta = [\beta_1, \ldots, \beta_K]^T \quad (5)$$

where $\beta_k$ represents the index of BS to which user k is associated, i.e., $\beta_k \in \mathcal{J}$ with $k \in \mathcal{K}$. The relationship between the activation set of BS j and the elements of an association vector can be described as $$S_j = \{k : \beta_k = j\}. \quad (6)$$

Considering the post-processing received signal at user k in (4), the instantaneous rate of UE k from BS j can be obtained as $$R_{k,j}(\beta) = \log_2 \left| I_{n_k} + V^{-1}_{k,j}(\beta) P_{k,j} W^*_k H_{k,j} F_{k,j} F^*_{k,j} H^*_{k,j} W_k \right| \quad (7)$$

$$V_{k,j}(\beta) = W^*_k H_{k,j} \left( \sum_{\substack{l \in S_j \\ l \neq k}} P_{l,j} F_{l,j} F^*_{l,j} \right) H^*_{k,j} W_k + \quad (8)$$

-continued $$W_k^* \left( \sum_{\substack{l \in \mathcal{J} \\ i \neq j}} \sum_{l \in S_l} P_{l,i} H_{k,i} F_{l,i} F_{l,i}^* H_{k,i}^* \right) W_k + N_0 W_k^* W_k$$

where $V_{k,j}$ is the interference and noise covariance matrix.

The instantaneous per-user throughput can be expressed as $$r_k(\beta) = \sum_{j \in \mathcal{J}} \mathbb{1}_{\beta_k = j} R_{k,j}(\beta) \tag{9}$$

where $\mathbb{1}_{\beta_k,j}$ is the indicator function such that $\mathbb{1}_{\beta_k}{}^{-j}=1$ if $\beta_k=j$, and $\mathbb{1}_{\beta_k=j}=0$ if $\beta_k \neq j$. Note that the instantaneous rate in (7) and hence the instantaneous per-user throughput in (9) change according to the activation sets $S_j$, and thus the throughput is a function of the association vector $\beta$.

3 Centralized vs. Distributed User Associations

Figure 4:
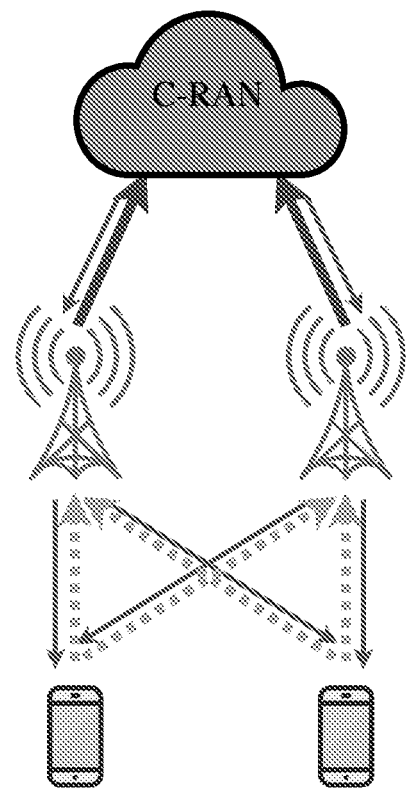
FIG. 4 is a diagram of overhead structure for centralized user association over PDCCHs (solid arrows) and PUCCHs (dashed arrows).

An optimization problem can be formulated to find the association vector to maximize the network sum rate, subject to load balancing and unique association constraints. Such an optimization problem may be formulated as an integer nonlinear programming, which is known to be NP-hard due to its non-convex and nonlinear structure and presence of integer variables. It has been shown that there is no analytical solution for this problem due to the presence of integer variables. Suboptimal and/or heuristic centralized algorithms can be used to solve such a problem. Although centralized algorithms can reach a near-optimal solution, they require a central coordinator, for example, located in a cloud-radio access network (C-RAN), to collect all required CSI and perform the user association process. Such a centralized structure is depicted in FIG. 4 where BSs transmit CSI reference signals via physical downlink control channels (PDCCHs) to enable UEs to estimate the CSI. In the ideal case, the estimated CSI is sent back to BSs and then forwarded to C-RAN where the central coordinator is located. Since at each iteration of a centralized algorithm user instantaneous rates are updated based on the current association vector, raw CSI and not the SINR must be available to compute these user rates. After collecting all required CSI from the network, the central coordinator runs the user association algorithm to find the best possible connections. The signaling overhead in this ideal centralized structure is usually high due to network densification in 5G HetNets, which requires a significant amount of CSI to be reported. Although centralized algorithms may reach a near-optimal solution, they can suffer from high computational cost and time complexity as the network size increases. Moreover, the erratic nature of mmWave channels in 5G HetNets may require frequent CSI updates and hence makes the practical implementation of these centralized algorithms challenging.

A centralized user association algorithm can alternatively be implemented in a more practical approach with lower signaling overhead, albeit at possibly reduced performance. In an example of such an alternative case, UE only reports specific CSI components to BS and not raw CSI to avoid the above large signaling overhead. In particular, each BS transmits a request for CSI estimation at UEs. Then, each UE measures channel quality indicators (CQIs), and reports these CQIs to the corresponding BSs. Then, each BS reports the received CQIs from all UEs to C-RAN, where the central coordinator runs the algorithm to obtain a near-optimal association vector. The algorithm output (e.g., network throughput) will be less than in the case of using raw CSI due to the use of CQI instead, which does not allow an accurate update of the interference and noise covariance matrix at each iteration. Nevertheless, this is a trade-off network operators need to make between the algorithm output and signaling overhead. Finally, BSs are notified about their associations and each UE is informed by its serving BS.

Figure 5:
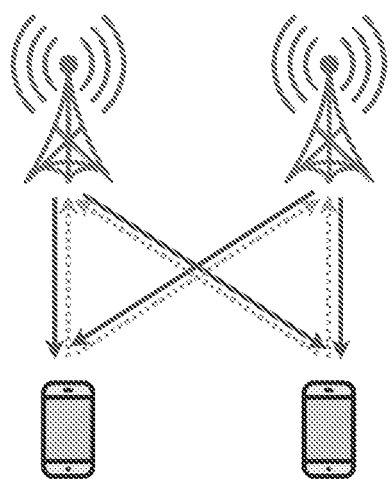
FIG. 5 is a diagram overhead structure for distributed user association, over PDCCHs (solid arrows) and PUCCHs (dashed arrows).

Distributed user association algorithms described below provide a low-complexity approach with a reasonably low convergence time. As depicted in FIG. 5, these algorithms only involve low bit-rate signaling exchanges between UEs and BSs such that association decisions happen in a distributed fashion without a need for a central coordinator. Here the UEs exchange messages with the BSs directly and the association decision for different UEs can occur at different times. Below, we employ matching theory and describe a new matching game to solve the user association problem in a distributed fashion. We also describe a multi-game matching algorithm to further improve the network performance. This algorithm is semi-distributed as it only requires a central coordinator to exchange minimal signaling overhead.

4 Matching Game

Matching theory provides a suitable framework for user association in fast-varying mmWave systems due to its low-complexity and fast convergence time. User association can be posed as a matching game with two sets of players—the BSs and the UEs. In this game, each player collects the required information to build a preference list based on its own objective function using local measurements. Each user then apply to the BSs based on its preference list, and association decision is made by the BSs individually. Thus, no central coordinator is required to perform user association. This feature makes matching theory an efficient approach for designing a distributed user association in 5G HetNets.

4.1 User Association Matching Game Concepts

In the context of matching theory, user association problem can be considered as a college admission game where the BSs with their specific quota represent the colleges and UEs are considered as students. This framework is suitable for user association in a HetNet where BSs may have different quotas and capabilities. In order to formulate our user association as a matching game, we first introduce some basic concepts based on two-sided matching theory.

4.1.1 Preference Relation

A preference relation $\succeq_k$ helps UE k to specify the preferred BS between any two BSs $i,j \in \mathcal{K}$, $i \neq j$ such that $$k \succeq_k i \Leftrightarrow \Psi_{k,j}^{UE} \geq \Psi_{k,i}^{UE} \Leftrightarrow \text{UE } k \text{ prefers BS } j \text{ to BS } i \tag{10}$$

where $\Psi_{k,j}^{UE}$ is the preference value between UE k and BS j, which can be simply a local measurement at the UE (e.g. SINR). Similarly, for any two UEs $k,l \in \mathcal{K}$, $k \neq l$, each BS builds a preference relation $\succeq_j$ such that $$k \succeq_j l \Leftrightarrow \Psi_{k,j}^{BS} \geq \Psi_{l,j}^{BS} \Leftrightarrow \text{BS } j \text{ prefers UE } k \text{ to UE } l \tag{11}$$

4.1.2 Preference List

Based on the preference relations, each UE k (BS j) builds its own preference list $\mathcal{P}_k^{UE}$ ($\mathcal{P}_j^{BS}$) over the set of all BSs (UEs) in descending order of preference.

4.1.3 Matching Relation

Association vector defines a matching relation (in this description we use the terms "association vector" and "matching relation" interchangeably), which specifies the association between UEs and BSs and has the following properties
1. $\beta_k \in \mathcal{J}$ with $k \in \mathcal{K}$;
2. $\beta_k = j$ if and only if $k \in \mathcal{S}(j)$.

The second property states that the association vector is a bilateral matching.

4.1.4 Matching Game

A user association matching game $\mathcal{G}$ is a game with two sets of players (BSs and UEs) and a set of rules which apply on the input data to obtain a result. The input data of the game are:

Preference lists of BSs: $\mathcal{P}_j^{BS}$, $\forall j \in \mathcal{J}$
Preference lists of UEs: $\mathcal{P}_k^{UE}$, $\forall k \in \mathcal{K}$
BSs' quotas: $q_j$, $\forall j \in \mathcal{J}$ and game outcome or result is the association vector $\beta$. Each particular game is defined by the specific way of building preference lists and its set of rules.

4.2 Building Preference Lists

A preliminary step in a matching game is to build the preference lists of the players. In this subsection, we describe the process of building the preference lists for the UEs and BSs. These preference lists can be built based on a number of metrics, including users' instantaneous rates, channel norms or UEs' local measurements.

4.2.1 Users' Instantaneous Rates

Using users' instantaneous rates to build preference lists uses the knowledge of both instantaneous and large-scale CSI. For example, we can use the user instantaneous rate in (7) as the objective function for both sides of the game, i.e., $$\Psi_{k,j}^{UE} = \Psi_{k,j}^{BS} = R_{k,j}, \forall k \in \mathcal{K}, j \in \mathcal{J} \quad (12)$$

In other words, each UE prefers the BS which provides the highest user instantaneous rate, and each BS is willing to serve the UE that can get the highest user instantaneous rate. This metric, however, results in frequent update of the preference value which depends on the association of other users and can complicate the process. One approach is fixing the association of all other UEs based on an initial association vector for computing the current user's instantaneous rates from all BSs.

Alternatively, we can switch the association of the current UE with another UE connected to a BS while computing the instantaneous rate from that BS to the current UE, in order to maintain the BS quota. This switching can be either random or with the weakest UE connected to that BS.

4.2.2 Channel Norms

The preference lists can alternatively be built based on just CSI. As stated earlier, we assume both instantaneous and large-scale CSI available through beamforming CSI estimation techniques. In this case, the preference values can be expressed as the Frobenius norm of a MIMO channel $$\Psi_{k,j}^{UE} = \Psi_{k,j}^{BS} = \|H_{k,j}\|_F, \forall k \in \mathcal{K}, j \in \mathcal{J} \quad (13)$$

where $H_{k,j}$ is the channel matrix between UE k and BS j, and the operator $\|.\|_F$ represents the Frobenius norm. Using the channel norm, each UE (BS) ranks the BSs (UEs) and builds its own preference list such that the BS (UE) with the strongest channel (highest channel norm) is the most preferred one. The preference lists can also be built based on large-scale CSI alone, which will stay valid for longer durations but may result in a lower overall network utility.

4.2.3 Local CQI Measurements

Yet another alternative approach to building the preference lists is based on UEs' local measurements. Using reference signal received power (RSRP) information, each UE measures the received SINR from each BS as a ratio of a valid signal to non-valid signals. Then, the UE converts this SINR information to CQI values and reports them to BSs via the PUCCH signaling mechanism. In this approach, the preference values are given by $$\Psi_{k,j}^{UE} = \Psi_{k,j}^{BS} = CQI_{k,j}, \forall k \in \mathcal{K}, j \in \mathcal{J} \quad (14)$$

where $CQI_{k,j}$ represents the channel quality between UE k and BS j. Using CQI values, each UE (BS) ranks the BSs (UEs) such that the BS (UE) with the highest CQI is the most preferred one. CQI values are attractive in the sense that they are simple to measure locally at each UE and can be reported to BSs through uplink control information.

5 Deferred Acceptance User Association Matching Game

Below, we describe the rules of this game in the context of user association. Before starting the game, we set the preference index of all UEs to one ($m_k = 1$, $\forall k$), initialize the waiting lists of all BSs ($\mathcal{W}_j^0 = \emptyset$, $\forall j$), and form a rejection set $\mathcal{R}$ including all K UEs. At nth iteration of the game, each UE k applies to its $m_k$th preferred BS by sending an application message. Each BS j then ranks its new applicants together with the UEs in its current waiting list ($\mathcal{W}_j^{n-1}$) based on its preference list, keeps the first $q_j$ UEs in its new waiting list $\mathcal{W}_j^n$, and rejects the rest of UEs. Each BS accordingly sends a response of either rejection or waitlisting to new UE applicants as well as those previously in its waiting list but are now rejected. Rejected UEs remain in the rejection set, update their preference index $m_k$, and apply to their next preferred BS in the next iteration. At each new iteration, each BS forms a new waiting list by selecting the top $q_j$ UEs among the new applicants and those on its current waiting list. The game terminates when the rejection set is empty or every UE in the rejection set has applied to all BSs.

Figure 6:
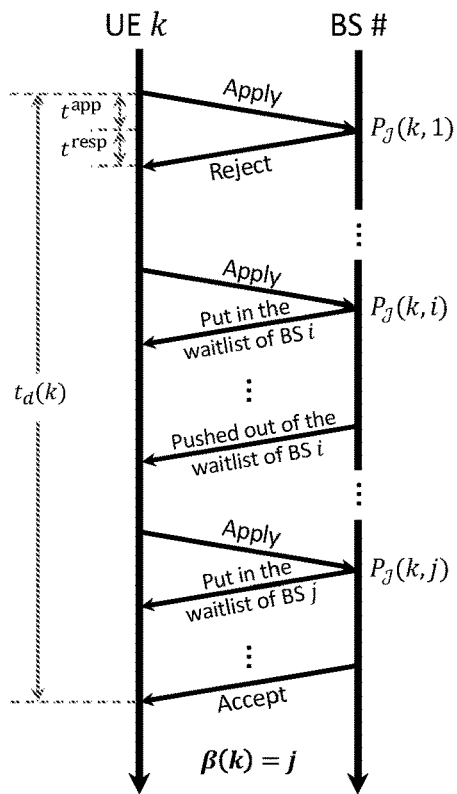
FIG. 6 is a flowchart of an association process in DA game when a UE k is associated with BS j
Figure 7:
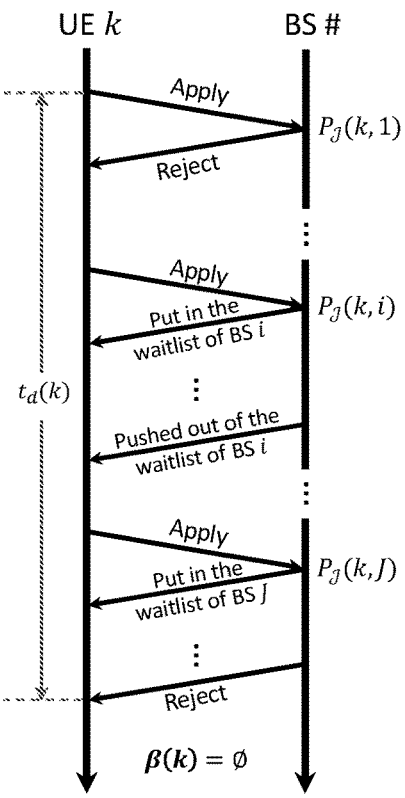
FIG. 7 is a flowchart of an association process in DA game when UE k is rejected by all BSs.

In the DA game, the associations are only determined when the game terminates. The BSs use their waiting lists to keep the most preferred UEs over all application rounds, and the final waiting lists after the last iteration determine the associations. This DA user association process is shown in FIG. 6, where a UE k is associated with BS j, and in FIG. 7, where UE k is rejected by all BSs. The algorithm for the DA user association game is described as follows

---

Data: $\mathcal{P}_j^{BS}$, $\mathcal{P}_k^{UE}$, $q_j$, $\forall k \in \mathcal{K}$, $j \in \mathcal{J}$ Result: Association vector $\beta = [\beta_1, \beta_2, \ldots, \beta_K]$ Initialization: Set $m_k = 1$, $\forall k$, $\mathcal{W}_j^0 = \emptyset$, $\forall j$, $n = 1$, and form a rejection set $\mathcal{R} = \{1, 2, \ldots, K\}$;

while $\mathcal{R} \neq \emptyset$ or $\Sigma_{j=1}^J q_j \neq 0$ do

| Each UE $k \in \mathcal{R}$ applies to its $m_k$th preferred BS;

| Each BS j forms its current waiting list $\mathcal{W}_j^n$ from its new applicants and its previous waiting

| list $\mathcal{W}_j^{n-1}$;

```
| Each BS j keeps the first q_j preferred UEs from $W_j^{n+1}$, and reject the rest of them;
| for k ∈ $\mathcal{R}$ do
| | $m_k \leftarrow m_k + 1$;
| end
| n ← n + 1;
end
Form β based on the final waiting lists $W_j$, j = 1, ..., J.
```

6 Early Acceptance Matching

The example of the DA game described above defers matching decision until the last iteration of the game, and thus is suitable for processes which do not require making real-time decisions. When applied to user association, however, all UEs are kept in BSs' waiting lists until the game terminates. This game can result in excessive delay for the association process and can be problematic when it comes to user association in a fast-varying mmWave systems or those requiring low-latency communications. In order to overcome this problem, we describe below an alternative set of matching games, called early acceptance (EA) games, to solve the user association problem in 5G cellular HetNets. In an EA game, BSs immediately decide about acceptance or rejection of UEs at each application round. This leads to a significantly faster and more efficient user association procedure.

6.1 Early Acceptance User Association Matching Games

We describe below three examples of distributed EA matching games, which follow a set of similar rules, but are different in terms of updating the UE/BS preference lists and reapplying to BSs. Similar to the DA game, an EA game takes as input data the preference lists of BSs and UEs and quota of BSs, and delivers a matching relation β. The initial step of these games is similar to that of DA which is to set the preference index of all UEs to one ($m_k$=1, ∀k) and form a rejection set $\mathcal{R}$ composed of all K UEs.

6.1.1 EA-Base Game

In a first example, the game defines the basic rules of the EA games. At each iteration of the game, each UE k∈ $\mathcal{R}$ applies to its $m_k$th preferred BS (say BS j) regardless of its available quota. If UE k is among the top $q_j$ UEs in the preference list of BS j, it will be immediately accepted by this BS, and the game updates the association vector with $\beta_k$=j. The accepted UEs will be removed from the rejection set $\mathcal{R}$ and any rejected UEs will apply to their next preferred BS in the next iteration.

This game is the simplest form EA since the UEs and BSs do not update their preference list during the game, and if a UE is rejected by a BS it will not reapply to that BS. These features make the EA-Base game very fast with only a small number of applications (≤J) for each UE. However, at the end of this game some UEs may be unassociated regardless of loading scenarios.

6.1.2 EA-PLU (EA with Preference List Updating) Game

In order to improve the performance of EA-Base, in a second example, we update the preference lists of UEs and BSs at the end of each iteration. When an association happens, the following updates occur: 1) associated UEs are removed from the rejection set and the preference lists of all BSs, and 2) for each new association with BS j, its quota is updated as $q_j \leftarrow q_j - 1$. When a BS runs out of quota, it informs all the UEs by sending a broadcast message and the UEs remove this BS from their preference lists. As a result, the UEs will no longer apply to that BS. Similar to EA-Base though, there is still no guarantee that all UEs are associated at the end of the EA-PLU game.

6.1.3 EA-PLU-RA (EA with Preference List Updating and ReApplying) Game

Figure 8:
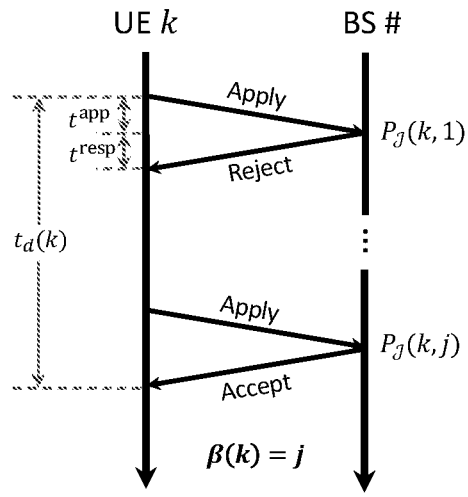
FIG. 8 is a flowchart of a user association process in an EA game when UE k is associated with BS j.
Figure 9:
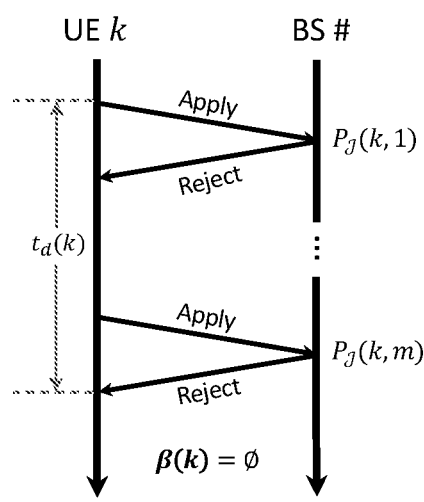
FIG. 9 is a flowchart of a user association process in an EA game when UE k is not associated (rejected at the mth (last) iteration of the game, with m≥J).

In order to improve the percentage of associated users, in a third example, we allow each UE to reapply to those BSs from which it has been rejected in previous iterations. Recall that if a UE is rejected by a BS, it will be kept in the rejection set. In the following iterations, each UE applies to the next preferred BS in its updated preference list. When an UE reaches the end of its updated preference list, it comes back to the beginning and repeats the application process until its updated preference list becomes empty or it is associated. With this reapplication, when the length of the original preference list of each UE is equal to J, no UE is unassociated at the end of the game in underload and critical load cases (see Lemma 1). In case of an incomplete original preference list, UE unassociation is possible. The user association process in the EA-PLU-RA game is depicted in FIG. 8, when UE k is associated with BS j, and in FIG. 9, when UE k is not associated (i.e., rejected at the mth (last) iteration of the game, with m≥J). A formal description of this game is shown below.

We note that it is practical to update the preference lists of UEs and BSs after each round of applications during an EA matching game. When UE-BS associations occur, the associating BSs update their quota and preference lists. They also inform all other BSs (via backhaul links) and UEs (via a cell broadcast message) to update their preference lists accordingly. In particular, each BS updates its quota and remove associated UEs from its preference list. If a BS runs out of quota, all unassociated UEs remove that BS from their preference lists. This reporting mechanism incurs minimal signaling overhead in practical implementations.

```
Data: $\mathcal{P}_j^{BS}$, $\mathcal{P}_k^{UE}$, $q_j$, ∀k ∈ $\mathcal{K}$, j ∈ $\mathcal{J}$
Result: Association vector β = [$\beta_1, \beta_2, \ldots, \beta_K$]
Initialization: Set $m_k$ = 1, ∀k, and form the rejection set $\mathcal{R}$ = {1, 2, ..., K};
while $\mathcal{R} \neq \emptyset$ do
| Each UE k ∈ $\mathcal{R}$ applies to its $m_k$th preferred BS (namely BS j with $q_j \neq 0$);
| if k ∈ $\mathcal{P}_j^{BS}(1 : q_j)$ then
| | $\beta_k$ = j;
| | $q_j \leftarrow q_j - 1$;
| | if $q_j$ = 0 then
| | | Remove BS j from $\mathcal{P}_k^{UE}$, ∀k ∈ $\mathcal{K}$;
| | end
```

```
| | Remove UE k from $\mathcal{R}$ and $\mathcal{P}_j^{BS}$, $\forall j \in \mathcal{J}$;
| else
| | $m_k \leftarrow m_k + 1$;
| end
end
```

7 Multi-Game Semi-Distributed Matching

The distributed matching games are fast and efficient in terms of delay and power consumption, but due to the distributed nature, they may not reach the performance of centralized algorithms. If we can afford some delay and additional power consumption as well as a minimal central coordination, we can further enhance the performance in terms of a network utility. In this section, we describe an alternative user association optimization problem which aims to maximize a network utility function, then describe a multi-game matching algorithm which requires running multiple rounds of a game and a central coordinator to exchange minimal signaling messages.

7.1 User Association Optimization

We first formulate an optimization problem that maximizes a network utility function while satisfying load balancing constraints on the BSs. Defining the instantaneous user throughput vector $r(\beta) \triangleq (r_1(\beta), \ldots, r_K(\beta))$, we wish to find the optimal $\beta$, which maximizes an overall network utility function $U(r(\beta))$. We consider the widely used sum-rate utility function and write the optimization problem as $$\underset{\beta}{\text{maximize}} \; U(r(\beta)) \triangleq \sum_{k \in \mathcal{K}} r_k(\beta) = \sum_{k \in \mathcal{K}} \sum_{j \in \mathcal{J}} \mathbb{1}_{\beta_k=j} R_{k,j}(\beta) \quad (15a)$$

subject to $$\sum_{j \in \mathcal{J}} \mathbb{1}_{\beta_k=j} \leq 1, \; \forall k \in \mathcal{K}, \; \sum_{k \in \mathcal{K}} \mathbb{1}_{\beta_k=j} \cdot n_k \leq D_j, \; \forall j \in \mathcal{J} \quad (15b)$$

where the optimization variables are $\beta_k \in \mathcal{J}$ for $k \in \mathcal{K}$. Note that other utility functions such as the max-min fairness can also be applied. The first set of constraints in (15b) reflects the unique association criteria indicating that each UE can only be connected to one BS during an association block. The second set of constraints in (15b) represents the BSs' load constraints denoting that the sum of data streams of UEs served by each BS cannot exceed the total number of available data streams on that BS. That is, each BS j can only serve up to $q_j$ UEs (see (2)). Here, we consider an equal power allocation scheme to split each BS's transmit power equally among its associated users, i.e., $P_{k,j}=P_j/q_j$. Note that the load constraints allows our formulation to specify each BS's quota separately. This makes the resulting user association scheme applicable to HetNets where there are different types of BSs with different capabilities.

Due to the dependency between user association and interference structure of the network, user instantaneous rates or local measurements could change with different associations. Thus, the preference lists may change according to user associations. In particular, at the end of a user association matching game, we obtain an association vector $\beta$ which specifies the UE-BS connections. Since the user instantaneous rate is a function of $\beta$, the resulting preference lists at the end of a game round may be different from the original one at the start of the same round, and performing another round of a matching game may produce a better user association in terms of a network utility. In order to keep improving the network performance, we introduce a matching algorithm which plays multiple rounds of a matching game in an iterative manner. Each round of a game is aimed to maximize the sum-rate as in (15), given the initial association vector obtained from previous round of the game.

```
Algorithm 1: Multi-Game Matching Algorithm for User Association with Max-throughput Data: $\mathcal{J}$, $\mathcal{K}$, $q_j$, $\forall j \in \mathcal{J}$, Path loss information
Result: Near-optimal association vector $\beta^*$
Initialization:
- Set the number of games (N);
- Build initial preference lists of BSs and UEs ($\mathcal{P}_j^0$, $\mathcal{P}_k^0$, $\forall k, j$) based on channel norms;
- Perform a matching game (DA or EA) to obtain initial $\beta^1$;
for n = 1 : N do
| Calculate $R_{k,j}(\beta^n)$, $\forall k, j$;
| Build preference lists $\mathcal{P}_j^n$, $\forall k \in \mathcal{J}$ and $\mathcal{P}_k^n$, $\forall k \in \mathcal{K}$;
| Perform a matching game (DA or EA) to obtain $\beta^{n+1}$;
end
$\beta^* = \arg \max_{n=1,\ldots,N} U(r(\beta^n))$.
```

7.2 Multi-Game Matching Algorithm for Max-Throughput

This matching algorithm requires an initial association vector $\beta^1$ which can be obtained by performing a user association matching game in the initialization procedure. The preference lists of BSs and UEs for this initial game can be built based on channel norms as described in Sec. 4.2.

At each subsequent iteration of the algorithm, by fixing the associations of all other UEs based on the current association vector $\beta^n$, each UE computes the instantaneous rate it can get from each BS and reports this rate to the corresponding BS. Then, each BS (UE) updates its preference list by ranking all UEs (BSs) based on the computed instantaneous rates. Next, a matching game (DA or EA) is performed to obtain the new association vector $\beta^{n+1}$. This new association vector will be used to establish the preference lists for the next round.

The algorithm performs the matching game N times. At the end of each iteration, the BSs report their associations to a central coordinator which computes the utility function and keeps track of the best association vector. As N increases, there is a higher chance of obtaining a better association at the cost of more association delay and higher power consumption at the UEs. The value of N can be determined based on practical delay and power constraints. At the end of the algorithm, the central coordinator notifies the BSs with the best association vector corresponding to the highest network utility. Although this algorithm requires a central coordinator to keep track of the best association vector, at each iteration, the game is performed in a purely distributed manner. This algorithm is described in Alg. 1.

8 Alternatives and Implementations

Implementations of the approaches described above may be implemented in software, including using instructions stored on non-transitory machine-readable media, and these instructions when executed by a data processing system (e.g., a centralized and/or a distributed computing architecture) cause the system to perform the steps described above.

What is claimed is:

1. A method for maximizing a measure of total utility of a network including a plurality of base stations, a plurality of user devices, and a plurality of associations, wherein each association has a corresponding user device of the plurality of user devices and a corresponding base station of the plurality of base stations, the method comprising, performing an iteration, each iteration including
evaluating a current total utility of a plurality of current associations based on a measure of capacity for each association in a plurality of current associations;
selecting a swapping association from the plurality of current associations, the swapping association having a corresponding swapping base station in the plurality of base stations and a corresponding swapping user device in the plurality of user devices;
evaluating a total utility of the network resulting from possible swapping of the swapping association with other associations of the plurality of associations, each association of the other associations having a user device other than the swapping user device and a base station other than the swapping base station;
determining a best total utility resulting from the possible swapping;
determining whether the best total utility exceeds the current total utility; and
based on the determination of whether the best total utility exceeds the current total utility, modifying the plurality of current associations including modifying an association corresponding to the swapping user device.

2. The method of claim 1 wherein the measure of total utility includes a measure of total throughput or capacity.

3. The method of claim 1 wherein, in at least some iteration, determining whether the best total utility exceeds the current total utility includes determining that the best total utility exceeds the current total utility, and modifying the plurality of current associations include swapping the swapping association and an association of the other associations that yields the best total utility having an effect of removing the swapping association and the association of the other associations and adding an association of the swapping user device and the base station of the other association and adding an association of the user device of the other association and the swapping base station.

4. The method of claim 1 wherein, in at least some iteration, determining whether the best total utility exceeds the current total utility includes determining that the best total utility does not exceed the current total utility, and modifying the plurality of current associations include swapping the swapping association and an other association of the plurality of current associations.

5. The method of claim 4 further comprising selecting the other association of the plurality of current associations by selecting a user device other than the swapping user device such that different user devices are selected in different iterations.

6. The method of claim 1 wherein the measure of utility of an association in a plurality of associations depends on channel characteristics between the corresponding user device and corresponding base station.

7. The method of claim 6 wherein the channel characteristics between the corresponding user device and corresponding base station include multiple-input multiple-output (MIMO) channel characteristics.

8. The method of claim 6 wherein the measure of utility of an association in the plurality of associations further depends on channel characteristics between user devices and base stations corresponding to other associations of the plurality of associations.

9. The method of claim 1 wherein the measure of total utility includes a measure of total throughput or capacity;
wherein, in at least some iteration, determining whether the best total utility exceeds the current total utility includes determining that the best total utility exceeds the current total utility, and modifying the plurality of current associations include swapping the swapping association and an association of the other associations that yields the best total utility having an effect of removing the swapping association and the association of the other associations and adding an association of the swapping user device and the base station of the other association and adding an association of the user device of the other association and the swapping base station;
wherein the method further comprises selecting the other association of the plurality of current associations by selecting a user device other than the swapping user device such that different user devices are selected in different iterations; and
wherein the measure of utility of an association in a plurality of associations depends on channel characteristics between the corresponding user device and corresponding base station.

10. The method of claim 1, wherein at least some iterations include switching an association of a user device from one base station to another base station without swapping said association with another association to improve an overall utility.

11. The method of claim 1, wherein selecting the swapping association includes selecting said swapping association according to a utility achieved by said swapping association.

12. The method of claim 1, wherein the method further comprises, prior to the performing of the iteration, establishing a feasible plurality of current associations between the plurality of base stations and the plurality of user devices.

13. A method for associating a plurality of user devices with a plurality of base stations in a communication network, the method comprising a distributed process performed at the user devices and the base stations, the distributed process comprising:

at each user device, maintaining a preference list representing a set of individually ordered base stations;

at each base station, maintaining a preference list representing a set of individually ordered user devices;

at a first iteration of a plurality of iterative steps of the distributed process, for each user device of at least some of the user devices, sending a respective first application message from said user device to a respective first base station selected from the preference list of said user device, including sending said application message to indicate that the first user device is an applicant to form an association with said base station, and at a first base station of the plurality of base stations, receiving application messages sent from multiple of the user devices, selecting one or more of the user devices based at least in part on the received application messages, rejecting one or more of the user devices not selected by said base station, and sending rejection messages to the rejected one or more of the user devices.

14. The method of claim 13 wherein at each iteration of the plurality of iterative steps, the first base station selects user devices from a set of user devices comprising user devices from which application messages were received.

15. The method of claim 13 wherein maintaining the preference lists comprises maintaining said lists with individual elements ordered according to at least one of instantaneous communication rates between user devices and base stations, channel norms of channels between the user devices and the base stations, and channel quality indicators of channels between the user devices and the base stations.

16. The method of claim 13 wherein, at the first iteration at the first base station, receiving an application message from a first user device in a top part of the first base station's preference list, and sending an acceptance message to said first user device forming an association between the first base station and the first user device.

17. The method of claim 13 wherein, at the first iteration at each base station, receiving an application message from a first set of user devices in a top part of said base station's preference list, and sending an acceptance message to said first set of user devices forming an association between said base station and the first set of user devices.

18. The method of claim 13 comprising repeating the plurality of iterative steps of the iterative procedure to form successive associations of the user devices and the base stations.

19. The method of claim 13 wherein at each iteration of the plurality of iterative steps, the first base station selects user devices from a set of user devices comprising user devices from which application messages were received; and wherein maintaining the preference lists comprises maintaining said lists according to at least one of highest instantaneous communication rates between user devices and base stations, channel norms of channels between the user devices and the base stations, and channel quality indicators of channels between the user devices and the base stations;

wherein the method further comprises repeating the plurality of iterative steps of the iterative procedure to form successive associations of the user devices and the base stations;

wherein the method further comprises providing from the base stations data representing associations between user devices and base stations determined using the iterative steps of the distributed process to a central controller, and receiving from the controller at the base stations updated associations between the user devices and the base stations; and wherein the information representing the associations comprises data characterizing channels corresponding to the associations.

\* \* \* \* \*